J. M. HOPKINS.
LIQUID-MEASURES.
No. 171,382. Patented Dec. 21, 1875.
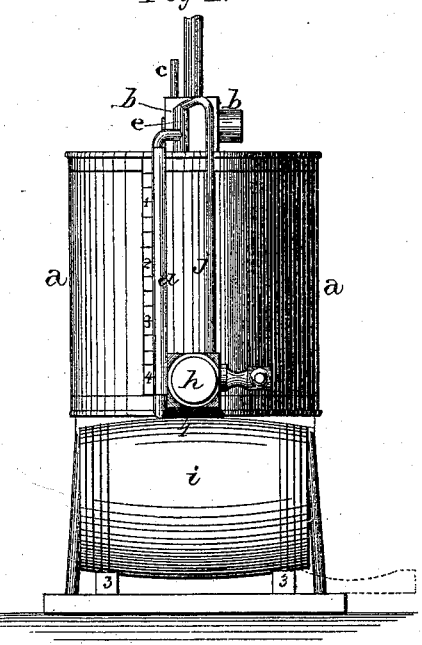
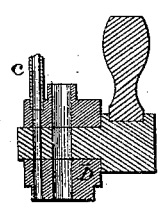
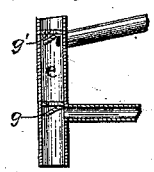
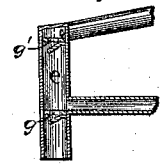
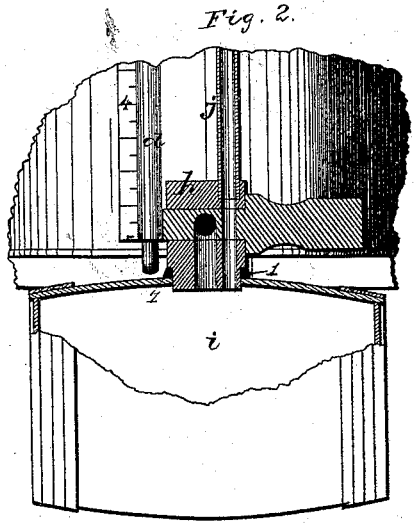
WITNESSES.
INVENTOR.

UNITED STATES PATENT OFFICE.

JAMES M. HOPKINS, OF LOUISVILLE, KENTUCKY.

IMPROVEMENT IN LIQUID-MEASURES.

Specification forming part of Letters Patent No. 171,382, dated December 21, 1875; application filed November 18, 1875.

*To all whom it may concern:*

Be it known that I, JAMES M. HOPKINS, of Louisville, in the county of Jefferson and State of Kentucky, have invented certain new and useful Improvements in Devices for Filling Liquid-Packages; and I do hereby declare the following to be a full, clear, and exact description of the invention, such as will enable others skilled in the art to which it pertains to make and use it, reference being had to the accompanying drawings, which form part of this specification.

My invention relates to an improvement in filling liquid-packages; and it consists in the arrangement and combination of devices that will be more fully described hereafter.

The accompanying drawings represent my invention.

$a$ represents the measuring-tank, which may be of any desired size, and which is filled from the main reservoir, that is placed in any suitable position above it, through the cock $b$. The shell and plug of this cock have each two openings through it—one for the inflow of liquid from the reservoir, and the other for the escape of the displaced air. The tank $a$ is provided with a gage, $d$, that opens from the under side of the tank, extends up along the side, and has its upper end bent over, so as to connect with a larger vertical pipe, $e$, that opens into the top of the tank. All air that is in the tube $d$, as the liquid rises, is driven upward through the pipe $e$ into the top of the tank through the downwardly-opening valve $g$. The cock $h$, through which the liquid flows from the tank $a$ into the barrel or package $i$, has two openings through its shell and plug—one for the passage of the liquid, and the other for the passage of the displaced air from the barrel—both of the said passages being controlled by the plug. Extending up from the air-passage is the tube $j$, that conveys the displaced air from the barrel back into the tank $a$, through the enlarged vertical pipe $e$ and the two downwardly-opening valves $g$ $g'$ placed therein—one just below the junction of the pipe $j$, and the other below the junction of the gage. The nozzle of the cock $h$ is made long enough to extend down into the barrel below the staves a suitable distance, so that as the liquid rises it seals both the passage for the outflow of air and the passage for the inflow of liquid. A rubber packing-ring, 1, placed around the nozzle of the cock, makes an air-tight joint around the bung, and as the air cannot escape after the air-passage is closed, the inflowing liquid can compress the air that remains in the barrel only to a certain extent, and then the back pressure of this air stops the inflow of the liquid before the barrel is quite full.

The liquor that is in the nozzle of the cock below the plug is always lost when the barrel is allowed to fill, and as there is seldom any means of determining this, the amount of liquor lost in a single day costs considerable. By having the liquor act as a sealing medium, the inflow is checked at just the right time, leaving just room enough to receive what is in the nozzle.

Pivoted to the floor at their rear ends are two swinging bars of wood, 3, slightly hollowed out near their centers, upon which the barrel rests. The barrel is placed in position under the cock, and then the bars are inserted under the ends, and moved toward each other sufficiently far to raise the barrel upward against the under side of the cock, and form a tight joint around the bung.

Instead of these bars any other suitable elevating devices may be used, as the only object is to raise the barrel up against the under side of the faucet.

Instead of the top of the enlarged pipe $e$ being closed, it may be provided with a downwardly-opening valve, as shown in Fig. 4, so that air may be supplied to the tank in sufficient quantities in case there should not be enough from the cask being filled.

The valves in this pipe may be dispensed with, if so desired, though they are preferred, as the measure is more complete with them, and in some respects works better.

Having thus described my invention, I claim—

1. A measure having a cock for the inflow of liquids, that is provided with a passage for the outflow of displaced air, and a faucet for the outflow of liquid, that is provided with a passage, through which the air displaced from the cask into which the liquid flows from the measure is conducted to a pipe that commu.

nicates with the interior of the measure, as shown and described.

2. In a device for measuring liquids, the combination of the measure $a$, cock $b$, and faucet $h$ with the gage and vent tubes $d$ $j$, which enter the top of the measure, substantially as set forth.

In testimony that I claim the foregoing I have hereunto set my hand this 8th day of November, 1875.

JAMES M. HOPKINS.

Witnesses:
 HENRY RATTERMAN,
 R. H. HIGGINS.